United States Patent
Lu et al.

(10) Patent No.: US 7,945,075 B2
(45) Date of Patent: May 17, 2011

(54) CONVERTING A DIGITAL IMAGE FROM COLOR TO GRAY-SCALE

(75) Inventors: Juwei Lu, Toronto (CA); Mohanaraj Thiyagarajah, Scarborough (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 837 days.

(21) Appl. No.: 11/948,026

(22) Filed: Nov. 30, 2007

(65) Prior Publication Data
US 2008/0144892 A1    Jun. 19, 2008

Related U.S. Application Data

(60) Provisional application No. 60/870,645, filed on Dec. 19, 2006.

(51) Int. Cl.
*G06K 9/00* (2006.01)
(52) U.S. Cl. .... 382/118; 382/162; 382/167; 358/426.01
(58) Field of Classification Search ........... 382/118, 382/162, 167, 164, 176, 274, 305; 345/214; 348/61, 535, 441, 587; 358/426.01, 426.16
See application file for complete search history.

(56) References Cited

U.S. PATENT DOCUMENTS

| | | | |
|---|---|---|---|
| 5,130,789 A | 7/1992 | Dobbs et al. | |
| 5,282,152 A | 1/1994 | Caviasca et al. | |
| 5,489,996 A * | 2/1996 | Oku et al. | 358/518 |
| 6,101,272 A | 8/2000 | Noguchi | |
| 6,504,942 B1 | 1/2003 | Hong et al. | |
| 6,574,004 B1 | 6/2003 | Jacob et al. | |
| 6,774,909 B1 | 8/2004 | Nishio | |
| 6,778,186 B2 | 8/2004 | Mehigan | |
| 7,082,211 B2 | 7/2006 | Simon et al. | |
| 7,158,688 B2 | 1/2007 | Nako et al. | |
| 7,164,781 B2 | 1/2007 | Kim et al. | |
| 2001/0031073 A1 | 10/2001 | Tajima | |
| 2002/0164071 A1 | 11/2002 | Mishima | |
| 2003/0108225 A1 | 6/2003 | Li | |
| 2005/0068587 A1 | 3/2005 | Hayaishi | |
| 2005/0169520 A1 | 8/2005 | Chen et al. | |
| 2006/0104368 A1 * | 5/2006 | Okuyama et al. | 375/240.28 |
| 2006/0126941 A1 | 6/2006 | Higaki | |
| 2006/0140455 A1 | 6/2006 | Costache et al. | |
| 2006/0227238 A1 * | 10/2006 | Kuroki et al. | 348/353 |

FOREIGN PATENT DOCUMENTS

| | | |
|---|---|---|
| EP | 1669933 A2 | 6/2006 |
| WO | 2006126949 A1 | 11/2006 |

* cited by examiner

*Primary Examiner* — Samir A Ahmed
*Assistant Examiner* — Ali Bayat
(74) *Attorney, Agent, or Firm* — Mark P. Watson

(57) ABSTRACT

Converting a digital image from color to gray-scale. In one example embodiment, a method for converting a digital image from color to gray-scale is disclosed. First, an unconverted pixel having red, green, and blue color channels is selected from the color digital image. Next, the red color channel of the pixel is multiplied by $\alpha$. Then, the green color channel of the pixel is multiplied by $\beta$. Next, the blue color channel of the pixel is multiplied by $\gamma$. Then, the results of the three multiplication operations are added together to arrive at a gray-scale value for the pixel. Finally, these acts are repeated for each remaining unconverted pixel of the color digital image to arrive at a gray-scale digital image. In this example method, $\alpha+\beta+\gamma \approx 1$ and $\alpha > \beta$.

20 Claims, 2 Drawing Sheets

CONVERTING A DIGITAL IMAGE FROM COLOR TO GRAY-SCALE

CROSS-REFERENCE TO A RELATED APPLICATION

This application claims priority to U.S. Provisional Patent Application Ser. No. 60/870,645, filed on Dec. 19, 2006, which is incorporated herein by reference in its entirety.

THE FIELD OF THE INVENTION

The present invention relates to image processing. More specifically, embodiments of the present invention relate to methods for converting a digital image from color to gray-scale.

BACKGROUND

One ongoing field of computer vision research is human face detection. Human face detection involves automatically detecting human faces and facial characteristics, such as skin color, in digital photographic images.

Various methods of face detection have been developed to automatically detect the presence of a human face in a digital photographic image. Some learning-based face detection methods such as those using neural networks and AdaBoost techniques usually work with gray-scale images. Thus, given a color input image, these face detection methods first convert the color input image to a gray-scale image before attempting to detect a human face in the gray-scale image.

For example, a color digital image I with the pixels $I(x, y)$ can be arranged in a $K_1 \times K_2$ pixel array. The term $(x, y)$ denotes the spatial location where $x=1, 2, \ldots, K_1$ and $y=1, 2, \ldots, K_2$ indicate the image row and column, respectively. Each pixel $I(x, y)$ represents the color vector $I(x, y)=[R(x, y), G(x, y), B(x, y)]$ in which $R(x, y)$, $G(x, y)$, and $B(x, y)$ denote R (red), G (green), and B (blue) color channels, respectively, of the image I. The input color image I can be converted to the output gray-scale image J using the following equation:

$$J(x,y)=\alpha \cdot R(x,y)+\beta \cdot G(x,y)+\gamma \cdot B(x,y) \quad \text{[Equation 1]}$$

where $\alpha$, $\beta$, and $\gamma$ are the weights corresponding to the three color channels R, G, and B.

The most popular values for the weights $\alpha$, $\beta$, and $\gamma$ in [Equation 1] use the luminance values of the so-called NTSC color space from standard NTSC conversion formula, which are $\alpha=0.299$, $\beta=0.587$, and $\gamma=0.114$. These popular values are optimized for displaying gray-scale pictures on monochrome (black and white) televisions. However, these popular values are not optimized for certain automated imaging processes, such as certain face detection processes.

SUMMARY OF EXAMPLE EMBODIMENTS

In general, example embodiments relate to methods for converting a digital image from color to gray-scale. Example embodiments can be used to produce gray-scale digital images that are optimized for various automated imaging processes including, but not limited to, face detection.

In one example embodiment, a method for converting a digital image from color to gray-scale is disclosed. First, an unconverted pixel having red, green, and blue color channels is selected from the color digital image. Next, the red color channel of the pixel is multiplied by $\alpha$. Then, the green color channel of the pixel is multiplied by $\beta$. Next, the blue color channel of the pixel is multiplied by $\gamma$. Then, the results of the three multiplication operations are added together to arrive at a gray-scale value for the pixel. Finally, these acts are repeated for each remaining unconverted pixel of the color digital image to arrive at a gray-scale digital image. In this example method, $\alpha+\beta+\gamma \approx 1$ and $\alpha > \beta$.

In another example embodiment, one or more computer-readable media have computer-readable instructions thereon which, when executed, implement the method for converting a digital image from color to gray-scale discussed above.

In yet another example embodiment, an image processing device includes a processor, and one or more computer-readable media. The one or more computer-readable media have computer-readable instructions thereon which, when executed by the processor, implement the method for converting a digital image from color to gray-scale discussed above.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the invention. Example embodiments of the invention will be disclosed and explained with additional specificity and detail through the use of the accompanying drawings in which.

DETAILED DESCRIPTION OF EXAMPLE EMBODIMENTS

In general, example embodiments relate to methods for converting a digital image from color to gray-scale. Example embodiments can be used to produce gray-scale digital images that are optimized for various automated imaging processes including, but not limited to, face detection.

Figure 1:
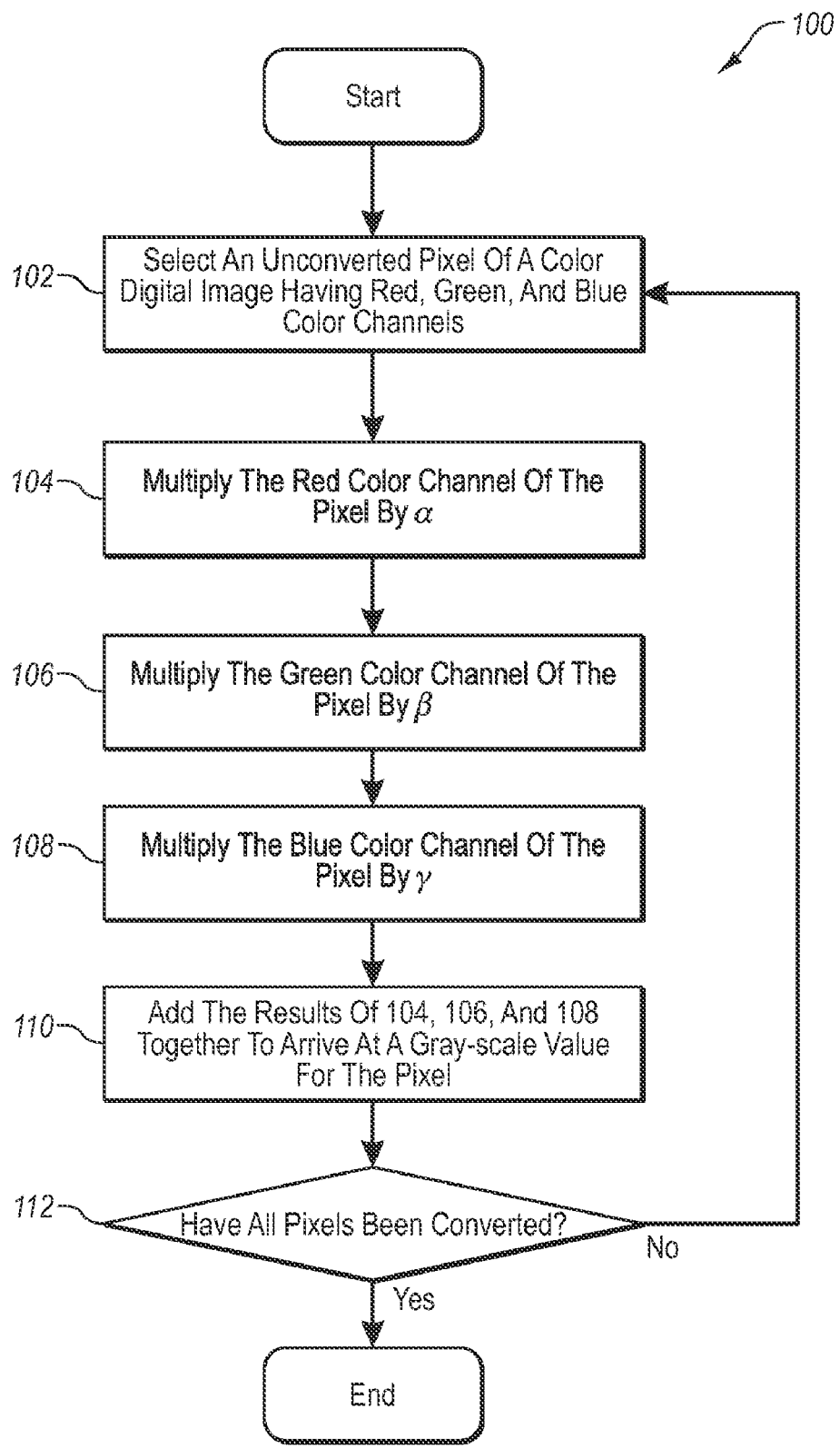
FIG. 1 discloses an example method for converting a digital image from color to gray-scale.

With reference now to FIG. 1, an example method 100 for converting a digital image from color to gray-scale is disclosed. More particularly, the example method 100 converts the R, G, and B values of each pixel of the color digital image to a corresponding gray-scale value.

The example method 100 and variations thereof disclosed herein can be implemented using computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras, digital camcorders, projectors, printers, scanners, copiers, or some combination thereof, such as a printer/scanner/copier combination or a digital camera/camcorder combination. An image processing device may include face detection capability, for example, in order to automatically distinguish people from scenery to ensure natural skin tones. For example, a printer with this face detection capability may include one or more computer-readable media that implement the example method 100, or a computer connected to the printer may include one or more computer-readable media that implement the example method 100.

Figure 2:
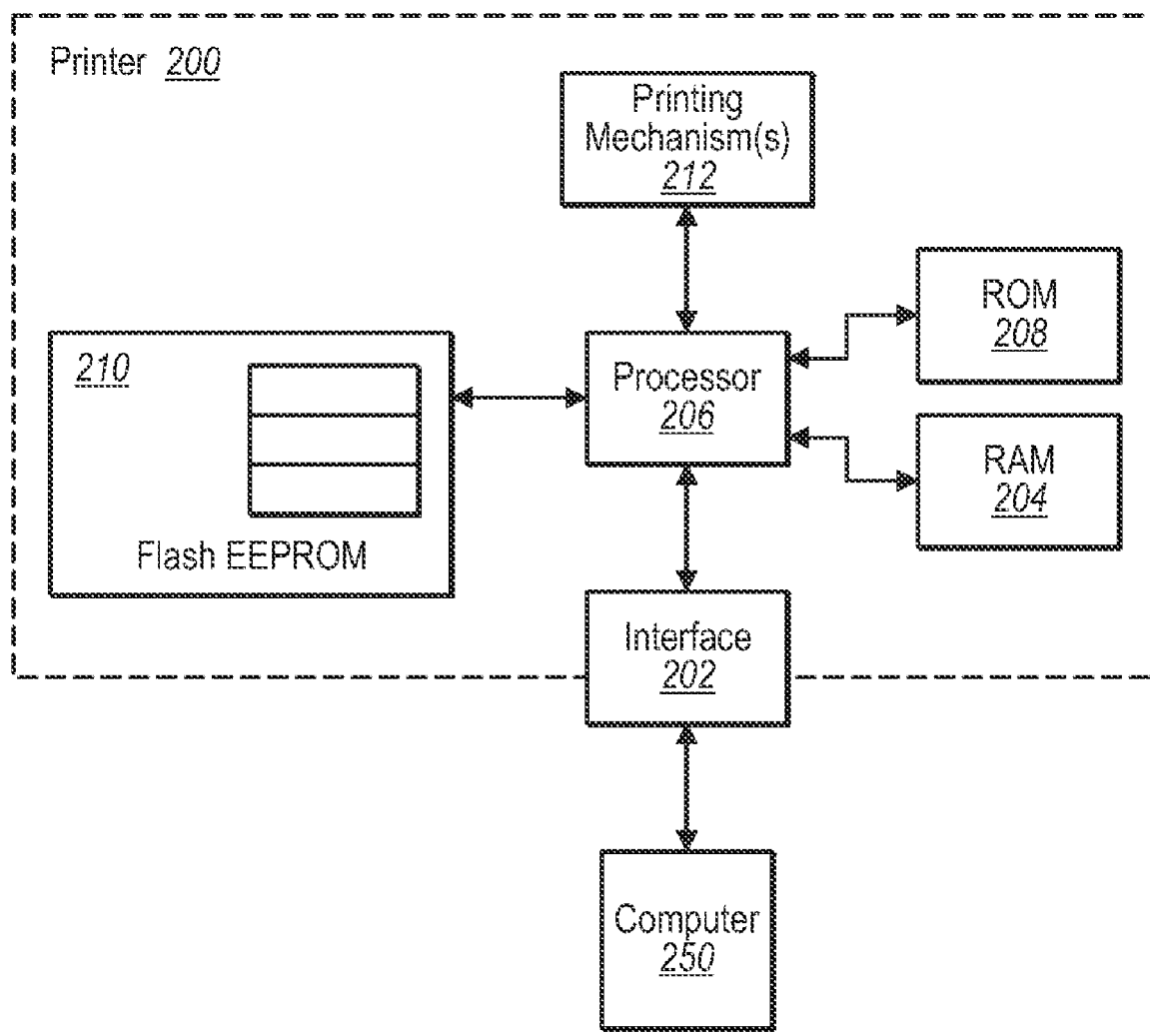
FIG. 2 is a schematic representation of an example printer.

A schematic representation of an example printer 200 is disclosed in FIG. 2. Printer 200 exchanges data with host computer 250 by way of an intervening interface 202. Application programs and a printer driver may also be stored for access on the host computer. When a print command is received from the application program, the printer driver controls conversion of the data to a format suitable for the printer 200 and sends the converted data to the printer 200. The driver also receives and interprets various signals and data from the printer, and provides necessary information to the user by way of the host computer 250.

When data is sent by host computer 250, interface 202 receives the data and stores it in a receive buffer forming part of RAM 204. RAM 204 can be divided into a number of sections, for example through addressing, and allocated as different buffers, such as a receive buffer or a print buffer for example.

A processor 206 uses computer-executable instructions stored on the ROM 208 or in the flash EEPROM 210, for example, to perform a certain function or group of functions, such as the method 100 for example. Where the data in the receiver buffer of the RAM 204 is a digital image, for example, the processor 206 can implement the methodological acts on the digital image of the method 100 to convert the digital image from color to gray-scale. Further processing, such as face detection, may then be performed on the gray-scale digital image, in order to automatically distinguish people from scenery to ensure natural skin tones when the digital image is printed by the printer 200, for example.

The fully processed digital image may then be stored in the print buffer of the RAM 204. The processor 206 may then cause the digital image in the print buffer of the RAM 204 by directing one or more printing mechanisms 212, such as a print head, platen, paper feed mechanism, print head driver, motor drive circuit, and/or various sensor circuits, to print the digital image.

It is understood that digital images may be received by the printer 200 from sources other than the computer 250 including, but not limited to, the flash EEPROM 210 or the ROM 208. In addition, where the printer 200 is a printer/scanner/copier combination, for example, the printer 200 may obtain the digital image by scanning a paper image. Example embodiments of the printer 200 include, but are not limited to, the Epson Stylus Photo R280, Epson Stylus Photo R380, Epson Stylus Photo RX595 and the Epson Stylus Photo RX680, each manufactured by Epson America Incorporated headquartered in Long Beach, Calif.

The example method 100 for converting a pixel of a digital image from color to gray-scale will now be discussed in connection with FIG. 1. The color digital image I with the pixels $I(x, y)$ can be arranged in a $K_1 \times K_2$ pixel array. The term $(x, y)$ denotes the spatial location where $x=1, 2, \ldots, K_1$ and $y=1, 2, \ldots, K_2$ indicate the image row and column, respectively. For example, where the image I is a 1280×1024 digital image, $K_1=1280$ and $K_2=1024$. Each pixel $I(x, y)$ represents the color vector $I(x, y)=[R(x, y), G(x, y), B(x, y)]$ in which $R(x, y), G(x, y),$ and $B(x, y)$ denote the R (red), G (green), and B (blue) color channels, respectively, of the image I. In one example embodiment, the color values may be stored as numbers in the range 0 to 255. This allows each color value to be stored in one 8-bit byte. Other number ranges and storage sizes are also possible and contemplated.

At 102, an unconverted pixel of the color digital image having red, green, and blue color channels is selected. For example, the pixel $I(1,1)$ can initially be selected. Before being converted from color to gray-scale, the pixel $I(1,1)$ includes a red color channel $R(1,1)$, a green color channel $G(1,1)$, and a blue color channel $B(1,1)$. The color channels of the pixel $I(1,1)$ can have values of $R(1,1)=90$, $G(1,1)=165$, and $B(1,1)=235$, for example.

At 104, the red color channel of the pixel is multiplied by $\alpha$. For example, the red color channel $R(1,1)$ of the pixel $I(1,1)$ can be multiplied by $\alpha$. Where $\alpha=0.85$ and $R(1,1)=90$, for example, the result of 104 is $0.85 \cdot 90=76.5$.

At 106, the green color channel of the pixel is multiplied by $\beta$. For example, the green color channel $G(1,1)$ of the pixel $I(1,1)$ can be multiplied by $\beta$. Where $\beta \approx 0.10$ and $G(1,1)=165$, for example, the result of 106 is $0.10 \cdot 165=16.5$.

At 108, the blue color channel of the pixel is multiplied by $\gamma$. For example, the blue color channel $B(1,1)$ of the pixel $I(1,1)$ can be multiplied by $\gamma$. Where $\gamma \approx 0.05$ and $B(1,1)=235$, for example, the result of 108 is $0.05 \cdot 235=11.75$.

At 110, the results of acts 104, 106, and 108 are added together to arrive at a gray-scale value for the pixel. For example, where $\alpha=0.85$, $\beta \approx 0.10$, $\gamma=0.05$, $R(1,1)=90$, $G(1,1)=165$, and $B(1,1)=235$, the result of 110 is $(0.85 \cdot 90) + (0.10 \cdot 165) + (0.05 \cdot 235) = 104.75$.

At 112, the color digital image is evaluated to determine whether all pixels of the color digital image have been converted from color to gray-scale. If all pixels of the color digital image have not yet been converted from color to gray-scale, the acts 102-112 are repeated until all pixels of the color digital image have been converted from color to gray-scale. For example, where the image I is a 1280×1024 digital image, if only the pixel at pixel $I(1,1)$ has been converted from color to gray-scale, the acts 102-112 will be repeated 1,310,719 times in order to convert all remaining unconverted pixels from color to gray-scale.

In one example embodiment, the values of $\alpha$, $\beta$, and $\gamma$ conform with the constraints $\alpha+\beta+\gamma \approx 1$ and $\alpha > \beta$. In addition, the values of $\alpha$, $\beta$, and $\gamma$ may further conform to the constraint $\beta > \gamma$. For example, $\alpha \approx 0.85$, $\beta \approx 0.10$, and $\gamma = 0.05$. Alternatively, in another example embodiment, the values of $\alpha$, $\beta$, and $\gamma$ may instead conform to the constraint $\gamma > \beta$. For example, $\alpha \approx 0.85$, $\beta \approx 0.05$, and $\gamma 0.10$. When an image is converted from color to gray-scale using the example method 100 in conformance with these constraints, the gray-scale image is optimized for various automated imaging processes including, but not limited to, face detection. For example, many learning-based face detection methods such as those using neural networks and ad-aBoost techniques may benefit from a color digital image being converted into a gray-scale digital image prior to any attempt to detect faces in the digital image.

One such face detection method that may benefit from a color digital image being converted into a gray-scale digital image is disclosed in U.S. patent application Ser. No. 11/556, 082, titled "Method and Apparatus for Detecting Faces in Digital Images" filed on Nov. 2, 2006, which is incorporated herein by reference in its entirety. By removing the skin-color-based classifier in the method of U.S. patent application Ser. No. 11/556,082, a gray-scale version of the method can be obtained. In one experiment using this modified version of the method of U.S. patent application Ser. No. 11/556,082, an image was processed with an increase of 2.85% in the detect rate where the image was converted from color to gray-scale using the example method 100 with $\alpha \approx 0.85$, $\beta \approx 0.10$, and $\gamma = 0.05$, with little influence on the false positive rate.

The example embodiments disclosed herein may be embodied in other specific forms. The example embodiments disclosed herein are to be considered in all respects only as illustrative and not restrictive.

What is claimed is:

1. A method for converting a digital image from color to gray-scale, the method comprising:
   using a processor to:
   (1) select an unconverted pixel of a color digital image having red, green, and blue color channels;
   (2) multiply the red color channel of the pixel by $\alpha$;
   (3) multiply the green color channel of the pixel by $\beta$;
   (4) multiply the blue color channel of the pixel by $\gamma$;
   (5) add the results of (2), (3), and (4) together to arrive at a gray-scale value for the pixel; and
   (6) repeat (1)-(5) for each remaining unconverted pixel of the color digital image to arrive at a gray-scale digital image, where $\alpha$, $\beta$, and $\gamma$ are weights corresponding to the three color channels R, G, and B, respectively, wherein $\alpha+\beta+\gamma \approx 1$ and $\alpha > \beta$.

2. The method as recited in claim 1, wherein $\beta > \gamma$.

3. The method as recited in claim 1, wherein $\gamma > \beta$.

4. The method as recited in claim 1, wherein $\alpha > \beta+\gamma$.

5. The method as recited in claim 1, wherein $\alpha \approx 0.85$.

6. The method as recited in claim 1, wherein $\beta \approx 0.10$.

7. The method as recited in claim 1, wherein $\gamma \approx 0.05$.

8. The method as recited in claim 1, wherein $\alpha \approx 0.85$, $\beta \approx 0.10$, and $\gamma \approx 0.05$.

9. The method as recited in claim 1, further comprising: using the processor to perform a face detection method on the gray-scale digital image.

10. One or more non-transitory computer-readable media having computer-readable instructions thereon which, when executed, implement a method for converting a digital image from color to gray-scale, the method comprising:
    (1) selecting an unconverted pixel of a color digital image having red, green, and blue color channels;
    (2) multiplying the red color channel of the pixel by $\alpha$;
    (3) multiplying the green color channel of the pixel by $\beta$;
    (4) multiplying the blue color channel of the pixel by $\gamma$;
    (5) adding the results of (2), (3), and (4) together to arrive at a gray-scale value for the pixel; and
    (6) repeating (1)-(5) for each remaining unconverted pixel of the color digital image to arrive at a gray-scale digital image, where $\alpha$, $\beta$, and $\gamma$ are weights corresponding to the three color channels R, G, and B, respectively, wherein $\alpha+\beta+\gamma \approx 1$ and $\alpha > \beta$.

11. The one or more non-transitory computer-readable media recited in claim 10, wherein $\alpha > \beta+\gamma$.

12. The one or more non-transitory computer-readable media recited in claim 10, wherein $\alpha \approx 0.85$.

13. The one or more non-transitory computer-readable media recited in claim 10, wherein $\beta \approx 0.10$.

14. The one or more non-transitory computer-readable media recited in claim 10, wherein $\gamma \approx 0.05$.

15. The one or more non-transitory computer-readable media recited in claim 10, wherein $\alpha \approx 0.85$, $\beta \approx 0.10$, and $\gamma \approx 0.05$.

16. The one or more non-transitory computer-readable media recited in claim 10, wherein the one or more computer-readable media have computer-readable instructions thereon which, when executed, implement a face detection method on the gray-scale digital image.

17. An image processing device comprising:
    a processor; and
    one or more non-transitory computer-readable media having computer-readable instructions thereon which, when executed by the processor, implement a method for converting a digital image from color to gray-scale, the method comprising:
    (1) selecting an unconverted pixel of a color digital image having red, green, and blue color channels;
    (2) multiplying the red color channel of the pixel by $\alpha$;
    (3) multiplying the green color channel of the pixel by $\beta$;
    (4) multiplying the blue color channel of the pixel by $\gamma$;
    (5) adding the results of (2), (3), and (4) together to arrive at a gray-scale value for the pixel; and
    (6) repeating (1)-(5) for each remaining unconverted pixel of the color digital image to arrive at a gray-scale digital image, where $\alpha$, $\beta$, and $\gamma$ are weights corresponding to the three color channels R, G, and B, respectively, wherein $\alpha+\beta+\gamma \approx 1$ and $\alpha > \beta$.

18. The image processing device as recited in claim 17, wherein the image processing device comprises a printer or a printer/scanner/copier combination.

19. The image processing device as recited in claim 17, wherein $\alpha > \beta+\gamma$.

20. The image processing device as recited in claim 17, wherein the one or more non-transitory computer-readable media have computer-readable instructions thereon which, when executed by the processor, implement a face detection method on the gray-scale digital image.

* * * * *